US008683741B2

(12) United States Patent
Castagno et al.

(10) Patent No.: US 8,683,741 B2
(45) Date of Patent: Apr. 1, 2014

(54) FLEXIBLE PLANT PROTECTOR

(76) Inventors: Leo Castagno, Rexburg, ID (US);
Trevor Butchart, Sugar City, ID (US)

(*) Notice: Subject to any disclaimer, the term of this patent is extended or adjusted under 35 U.S.C. 154(b) by 44 days.

(21) Appl. No.: 13/110,916

(22) Filed: May 19, 2011

(65) Prior Publication Data
US 2012/0291344 A1    Nov. 22, 2012

(51) Int. Cl.
*A01G 13/02*    (2006.01)
(52) U.S. Cl.
USPC .............................. 47/29.1; 206/423; 47/29.7
(58) Field of Classification Search
USPC ............. 47/20.1, 21.1, 29.1, 29.2, 29.3, 29.5, 47/29.7, 30, 32.3, 32.4, 32.5, 32.6; 229/106, 107, 108, 115, 155; 206/423
See application file for complete search history.

(56) References Cited

U.S. PATENT DOCUMENTS

| | | | | |
|---|---|---|---|---|
| 884,473 A * | 4/1908 | Dawson | 47/29.5 |
| 1,747,967 A * | 2/1930 | Bell | 47/31.1 |
| 2,540,707 A * | 2/1951 | Beukelman | 47/72 |
| 2,665,523 A * | 1/1954 | Hardman | 47/31.1 |
| 4,700,507 A * | 10/1987 | Allen | 47/32.4 |
| 4,903,431 A * | 2/1990 | Stoll | 47/29.2 |
| 5,222,325 A * | 6/1993 | Angus | 47/30 |
| 5,471,783 A * | 12/1995 | McLean | 47/30 |
| 5,605,008 A * | 2/1997 | Johnston et al. | 47/29.2 |
| D409,057 S * | 5/1999 | Wagner | D8/1 |
| 6,088,952 A * | 7/2000 | Wilson | 47/30 |
| 6,904,716 B2 * | 6/2005 | Weder et al. | 47/72 |
| 7,967,003 B2 * | 6/2011 | Lindsly et al. | 126/29 |

* cited by examiner

*Primary Examiner* — Rob Swiatek
*Assistant Examiner* — Ebony Evans
(74) *Attorney, Agent, or Firm* — John C. Meline

(57) ABSTRACT

Described are devices and methods for providing protection to plants from cold and other weather. A plant cover or protector is constructed of a translucent or other material, a flexible or bendable material, cut into a two-dimensional blank or shape and provides an easily assembled, self-supporting structure to be placed over one or more plants or a location. The plant protector is erected without the use of tools or need for a separate frame or support. The plant protector may be used with stakes or spikes. The plant protector may be collapsed to a planar configuration. The plant protector may be easily and inexpensively manufactured. The plant protector may be repeatedly used from season to season. A top portion of each plant protector may be easily and quickly closed or opened such as by manual manipulation. The plant protector comprises one or more supports or feet for increased contact with the ground and resilience against wind. The plant protector may be folded from a blank into a three-dimensional frustum or conical shape and placed in a desired location. Other shapes such as hexagonal and octagonal cross sections are possible. A preferred form is tapered from bottom to top.

15 Claims, 4 Drawing Sheets

FLEXIBLE PLANT PROTECTOR

BACKGROUND

1. Field of the Invention

The present invention relates generally to systems, devices and methods for protecting plants by covering them with a foldable self-supporting cover or protector made of plastic or other material.

2. Description of the Related Art

Seeds and bulbs are often started in a greenhouse or controlled growing environment. In such place, sensitive plants are protected from damaging conditions until they reach a size or state to withstand adverse weather. The use of greenhouses to extend the growing season dramatically increases the cost of production of fruits, flowers, vegetables and other plants and crops.

Through the years, various assemblies have been created and used to protect plants and crops during early growth in the spring and from low temperatures and frost in the spring. For example, a plastic or cardboard container is placed over each tomato plant in a garden to protect them from nightly cold temperatures. The containers allow tomato plants to get an early start on the growing season. The containers prevent or reduce the risk of transplanting before the overnight ambient temperature is sufficiently tolerable for plants.

Individual plant protectors tend to be expensive when compared to the price of produce obtained from each covered plant. It is often necessary to spread the cost of plant protectors over multiple growing seasons to make the return on investment worthwhile. Further, it is often difficult to anchor a plant protector to the ground so that it will not be blown away by a wind. Many plant protectors do not offer much ventilation. Although a user could cut ventilation openings in each container, such openings would reduce the insulation value of such modified containers.

Some types of containers require that someone remove them from plants each morning and replace each of them as night falls. Such requirement is impractical or expensive when used on a large number of plants or on an agricultural field containing many hundreds of plants.

One type of plant cover involves water-filled pockets or columns of a plastic material. This type of cover has several drawbacks. For example, it is difficult to use and maintain, and it is difficult to fill the individual tubes during or prior to installation. The water-filled plant cover is relatively heavy and presents a risk of damaging plants if handled improperly. Filling each tube is a time intensive endeavor thereby increasing the cost to benefit ratio of using such type of device.

Other embodiments of plant covers prevent ventilation or sunshine from reaching the plant. Other plant covers do not protect a plant from heavy rains, hail, or wind. Yet other plant covers require separate internal structures. These and other shortcomings are overcome through use of the current invention.

SUMMARY

A plant cover or protector provides an easily assembled, self-supporting structure to be placed over individual plants, groups of plants or location. The plant protector shields a plant from cold and weather damage. The plant protector is easily and quickly erected by hand without the use of tools. The plant protector may be erected from a single planar form without other materials or need for a separate frame or support. The plant protector may be used with stakes or spikes to increase wind resistance.

The plant protector may be collapsed to a planar configuration quickly and easily. One or more plant protectors may be stored in a minimum of space.

A top portion of each plant protector may be easily and quickly closed or opened such as by manual manipulation. An open top allows increased light to enter and increases ventilation.

The plant protector comprises a material that both acts as a thermal insulator, yet permits transmission of solar radiation into an interior space. Incident and ambient light and/or radiation pass through the plant protector. Heat is retained in the interior space, plant(s) and ground. Over night, the interior space usually remains warmer than an ambient temperature.

The plant protector designed for use in spring and autumn to maximize each growing season.

The plant protector may be easily and inexpensively manufactured. The plant protector may be repeatedly used—stored and re-used from year to year.

Optionally, the plant protector comprises ventilation openings that, for example, may be opened to permit watering and to provide increased ventilation to the interior of the plant protector.

The plant protector comprises fold-out flaps, support flaps, or feet for increased contact with the ground and increased resilience against wind. Optionally, the plant protector comprises one or more apertures through which a stake, spike or other object may be attached to the plant protector.

The plant protector may be manufactured in a wide variety of sizes, shapes and colors without substantially altering its protective features.

In short, described herein is an improved plant protector made from a flexible or bendable material that is cut or formed into a two-dimensional blank or shape. The plant protector may be folded from the blank into a three-dimensional frustum or conical shape and installed or placed in a desired location. Other shapes such as hexagonal and octagonal cross sections are possible. The general form is tapered from bottom to top.

This Summary has introduced a non-exclusive selection of aspects or concepts about the present invention in a simplified form that are further described below in the Detailed Description. This Summary is not intended to identify key or essential features of the claimed subject matter, and is not intended to be used to limit the scope of the claimed subject matter.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter and a preferred mode of use are best understood by reference to the following Detailed Description of illustrative implementations when read in conjunction with the accompanying drawings, wherein:

DETAILED DESCRIPTION

In view of the current state of plant covers or protectors as described in the Background, there is a need for an improved plant cover or protector. Described herein are systems, devices and methods for creating, forming, providing and installing an improved plant cover or protector.

Figure 1:
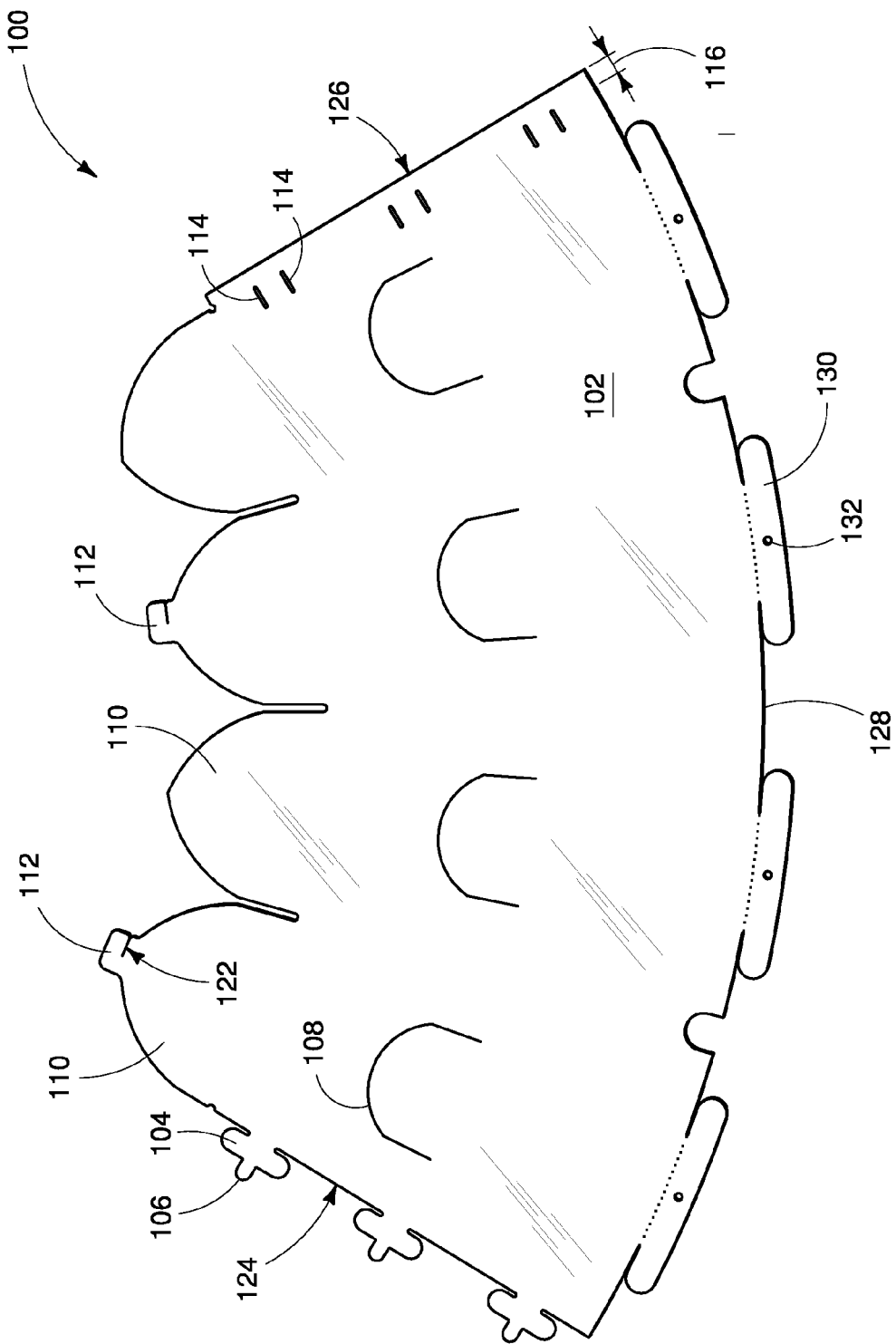
FIG. 1 is an overhead view of a two dimensional plant protector blank formed from a sheet of material according to an exemplary implementation of the invention.

FIG. 1 is an overhead view of a plant cover or plant protector 100 in an unassembled state. The plant protector 100 is preferably formed from a sheet of material 102 according to an exemplary implementation of the invention. With reference to FIG. 1, a plant protector 100 or plant protector blank (unassembled plant protector) comprises several features. One or more assembly tabs 104 are formed at or near one or more places along a first lateral edge 124 of the plant protector blank 100. Each assembly tab 104 comprises one or more fingers, protuberances, extensions or tab members 106. A tab member 106 may be extended through an assembly slot 114. There may be one or more corresponding assembly slots 114 for each assembly tab 104 or tab member 106. Tab members 106 not extended into or through an assembly slot 114 provide a gripping feature for improved or easier manual assembly and disassembly of the plant protector 100. Tab members 106 not extended into or through an assembly slot 114 also provide improved connection to and support of the first lateral edge 124 with respect to a second lateral edge 126.

The plant protector 100 also comprises one or more ventilation features. With reference to FIG. 1, an exemplary ventilation feature is a ventilation flap 108 formed in the plant protector blank 100. In practice, one or more ventilation flaps 108 may be opened by manually pushing the ventilation flap 108 inward, toward an interior space enclosed by a plant protector 100, or by manually pulling the ventilation flap 108 outward and thereby exposing a opening into the interior space enclosed by a plant protector 100.

The plant protector 100 further comprises one or more flexible, bendable or hinged top flaps 110. One or more top flaps 110 may be used to partially or fully enclose a top portion of the plant protector 100 when the plant protector 100 is assembled. Each top flap 110 may be of any shape such as square, rounded, scalloped and triangular. The shape of each top flap 110 may be the same as or different from each other. Similarly, the size of each top flap 110 may be the same as or different from each other. In a preferred implementation, the shape and size of each top flap 110 is approximately the same as the others. Also in a preferred implementation, a plurality of top flaps 110 is formed in the sheet of material 102.

Figure 4:
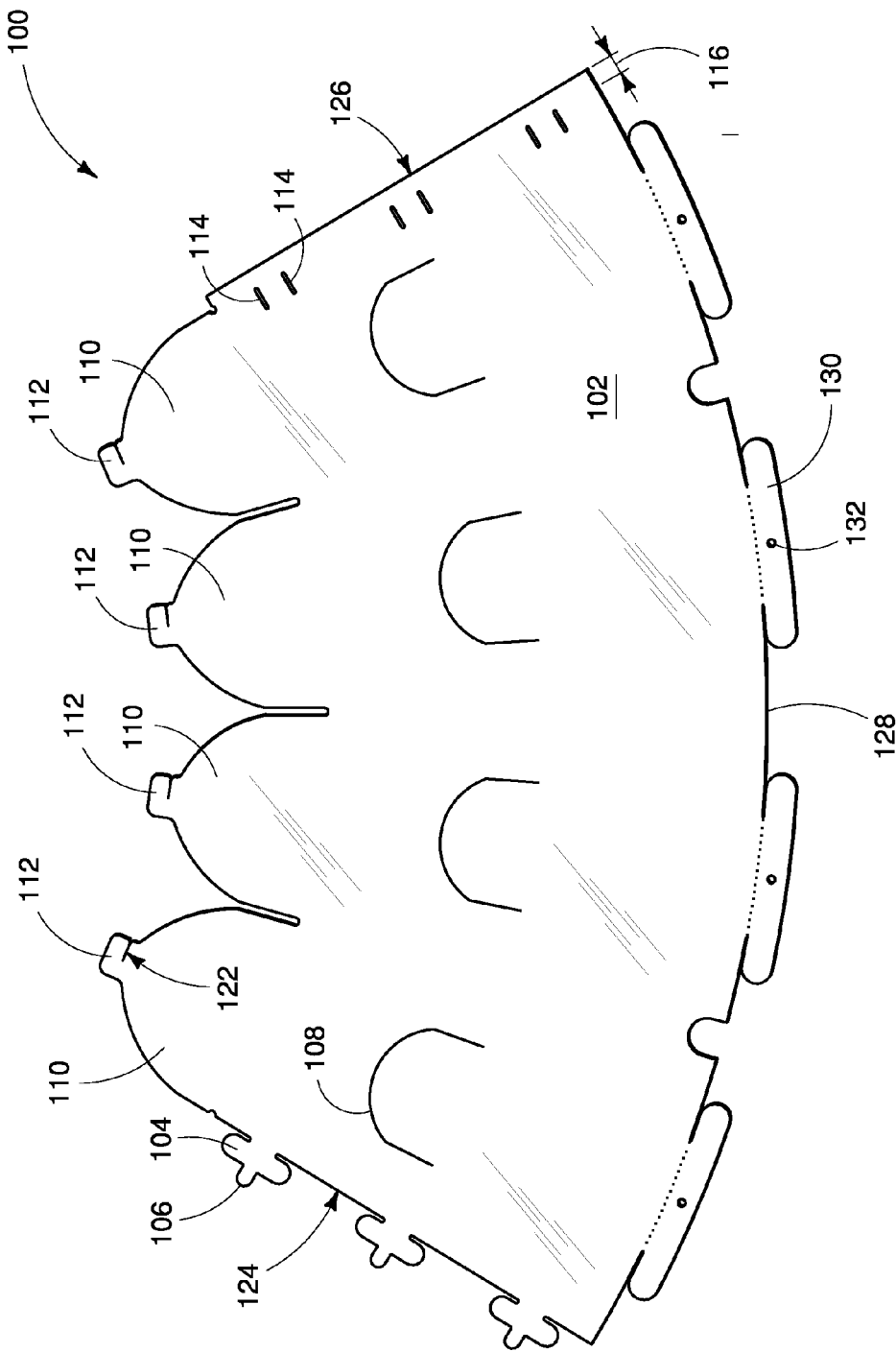
FIG. 4 is an overhead view of a two dimensional plant protector blank according to another exemplary implementation of the invention.

One or more of the top flaps 110 each comprise one or more top tabs 112. In a preferred implementation, each of at least two top flaps 110 comprises a slotted top tab 112 as shown in FIG. 1. The slotted top tabs 112 may be easily engaged with each other to partially or fully enclose a top portion of the plant protector 100 when the plant protector 100 is assembled. The top flaps 110 may overlap or abut one another. When overlapped, the top flaps 110 may partially or fully overlap each other. One or no edge of each top flap 110 may be exposed when one or more of the top tabs 112 are engaged to hold the set of top flaps 110 in place when the plant protector 100 is assembled. In one implementation, and as shown in FIG. 1, four top flaps 110 are formed in the sheet of material 102 and two opposing top flaps of the four top flaps 110 each comprise a slotted top tab 112. FIG. 4 is another exemplary implementation. As shown in FIG. 1 and FIG. 4, each slot 122 of the slotted top tabs 112 are in the same location relative to the respective top tab 112. When the plant protector is assembled, a slot 122 of a first top tab 112 may be engaged with a slot of a second top tab 112 thereby creating a reversibly locking mechanism to hold the top portion of the plant protector 100 closed. The slots 122 and top tabs 112 are designed to be easily and manually manipulated so that a minimal amount of time and effort is required to close a top portion of a plant protector 100.

With reference to FIG. 1, one or more assembly slots 114 are formed an overlap distance 116 from the second lateral edge 126. In one implementation, each assembly slot or pair of assembly slots 114 may have the same overlap distance 116 as the other assembly slots 114. In another implementation, each assembly slot or pair of assembly slots 114 may have its own overlap distance 116 somewhat or fully independently of the overlap distance 116 of the other assembly slot or pair of assembly slots 114. The overlap distance 116 as measured at any given location along the second lateral edge 126 is selected based on one or more factors. These factors may include a composition or characteristic of the sheet of material 102 (e.g., thickness, bendability or effort needed to flex, curl or assemble a plant protector 100); a size, width or length of tab member 106 or assembly tab 104; amount of overlap of the first lateral edge 124 with the second lateral edge 126; position of assembly tab 104 along the first lateral edge 124 or other location of the assembly tab 104; size or location of a ventilation flap 108 in the plant protector 100; size or shape of flexible top flap 110; and shape or size of one or more foot panel 130.

The plant protector 100 further comprises a bottom edge 128. In a preferred implementation, and as shown in FIG. 1, the bottom edge 128 is curvilinear so as to form a substantially even plane and base for the plant protector 100 when the plant protector 100 is assembled. In a preferred implementation, and as implicated by the shape of the plant protector blank in FIG. 1, the plant protector 100 forms a frustum, conical or pyramidal shape when the plant protector 100 is substantially or fully assembled. A frustum or conical shape generally has a smaller or narrower top than bottom as measured by cross-sectional area, diameter or distance through the plant protector.

The plant protector 100 preferably comprises one or more feet or foot panels 130 formed along or as part of the bottom edge 128. During assembly, a foot or foot panel 130 may be bent, flexed or extended out from the frustum, conical or pyramidal shape of the plant protector 100. One or more of the foot panels 130 may be formed with one or more apertures 132 for receiving or attaching a stake, peg or other entity.

The plant protector optionally comprises one or more arches 134 formed in the bottom edge for receiving a drip hose or other entity (not shown in FIG. 1). A presence of a drip hose would allow for watering of a plant protected by a plant protector 100 without a requirement to partially or fully open an enclosed top portion of a plant protector 100 prior to watering the plant.

Figure 2:
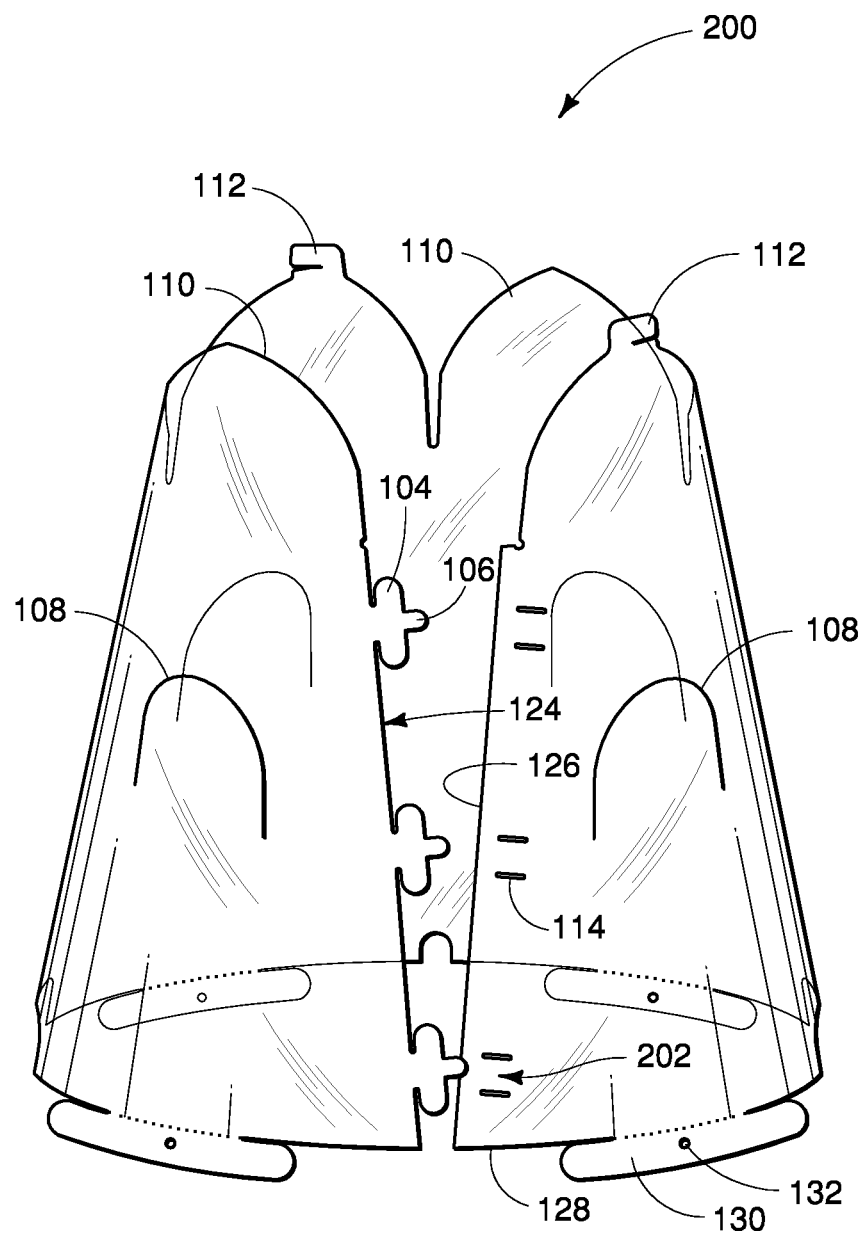
FIG. 2 is a perspective view of the plant protector shown in FIG. 1 and partially assembled.

FIG. 2 is a perspective view of the plant protector shown in FIG. 1, wherein the plant protector 200 is partially assembled. With reference to FIG. 2, a first engaged assembly tab 202 is reversibly attached to the body of the plant protector 200 near a second lateral edge 126. Two of the tab members 106 have been inserted through respective assembly slots 114. One method of assembling an assembly tab 104 is to manually bend an opposing pair of tab members 106 approximately 90 degrees to a near perpendicular orientation relative to the plant protector sheet 102 and insert each of the tab members 106 through a respective slot 114. A pair of tab members 106 may be quickly and easily inserted in a pair of slots 114. This process may be repeated as needed to assemble each of the assembly tabs 104 and thereby form the plant protector 200 into a frustum or cone shape.

With reference to FIG. 2, each of the foot panels 130 have been folded or curved outward from the partially formed frustum or cone shape of the plant protector 200. These foot panels 130 provide lateral support to the plant protector 200, allowing the plant protector 200 to resist lateral forces when in place on a surface or over a plant. Alternatively, the foot panels 130 may be folded, curved or bent toward an inward side of a plant protector 200. The foot panels 130 also provide lateral stability so as to reduce the chance that the plant protector 200 tips over and partially or fully exposes the plant and space beneath it. An exposed plant is then exposed to ambient weather and temperatures.

When the planar plant protector blank 102 is flexed or curled for assembly, each of a pair of top tabs 112 is coordinated with and oppose one another. In the implementation shown in FIG. 2, slots 114 of the top tabs 112 are designed to be engaged in one another. Slots 114 are an exemplary closure mechanism for the top flaps 110. Other mechanisms may be used including snaps, loops, hooks, tab and slot arrangements, hook and loop fasteners and adhesive. Slotted top tabs 112 as shown in FIG. 2 are preferable at least because they can be operated, engaged or disengaged with a single hand or a combination of a thumb and one or two fingers.

Figure 3:
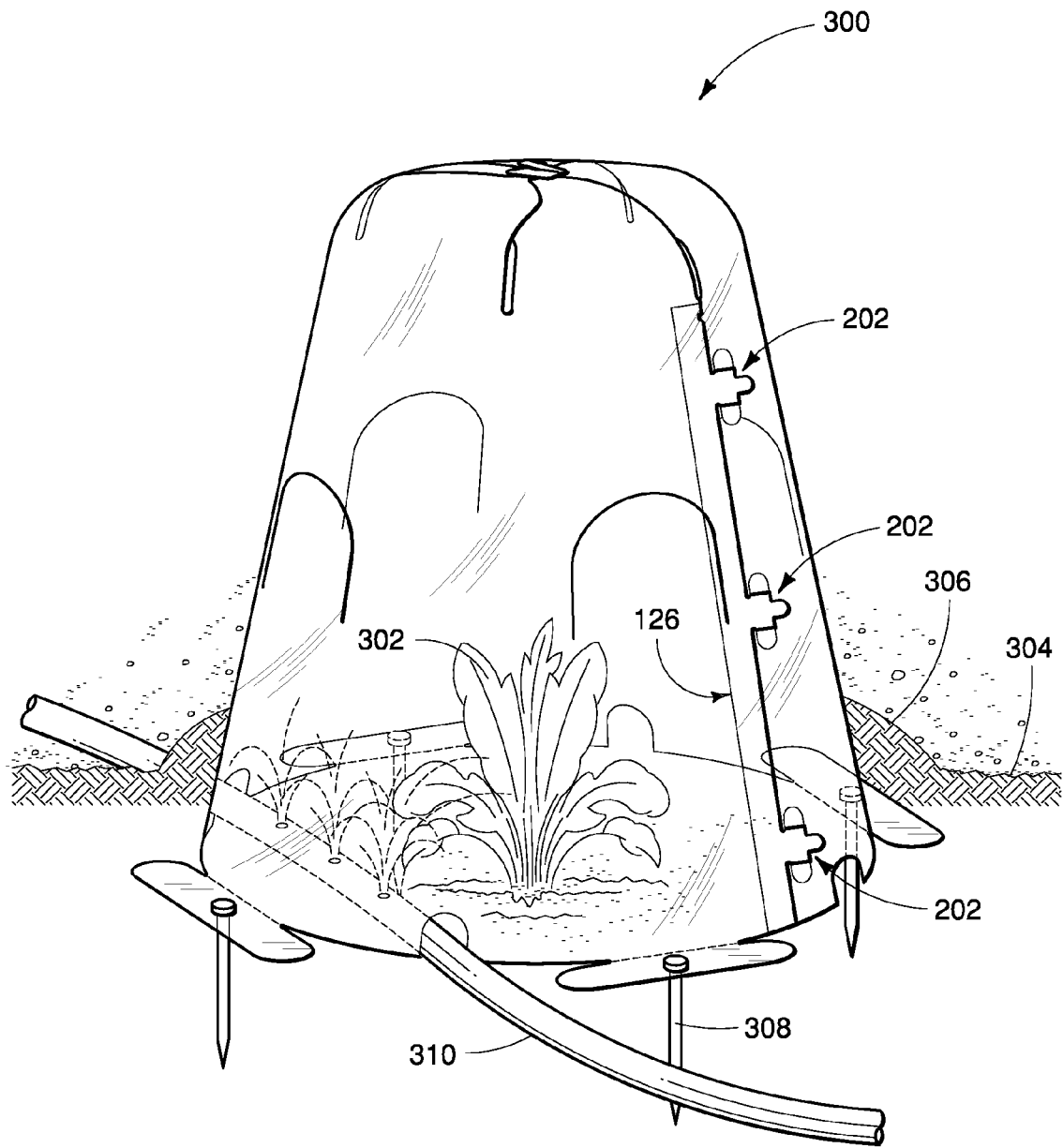
FIG. 3 is a side view of the plant protector shown in FIG. 1, fully assembled and placed to provide protection to a plant.

FIG. 3 is a side view of the plant protector 300 shown in FIG. 1, fully assembled and placed to provide protection to a plant 302. With reference to FIG. 3, a plant protector 300 has been fully assembled; each of the engaged assembly tabs 202 maintain the plant protector 300 in a closed state. Foot panels 130 have been folded outward (or inward). In a preferred method of installation, the ground or place of installation 304 should be at least moderately firmed prior to installing an assembled plant protector 300 to avoid tipping and/or lateral movement. After firming the ground 304, an assembled plant protector 300 is placed over one or more plants 302 and over a drip hose 310 or other fixture for delivering water, substance, heat or light. Optionally, a stake, peg, rod or other implement 308 may be placed in one or more apertures 132 of one or more foot panels 130. Then, loose dirt or other material or object is brought up and packed against a bottom portion of the assembled plant protector 300. The addition of such packing usually prevents the assembled plant protector 300 from tipping over even in wind and assists with heat retention when the temperature drops. Optionally, once an assembled plant protector 300 is installed, its top portion may be enclosed by engaging one or more top tabs 112. The top portion and top flaps 110 may be opened or closed as desired. At night, the top portion of the assembled plant protector 300 is preferably closed to preserve heat inside. During periods of direct sunlight or light, top portion of the assembled plant protector 300 can be opened to encourage air circulation, allow light to directly reach a plant 302, prevent mold or mildew formation and to reduce the opportunity for over-heating the interior of the assembled plant protector 300.

Once installed, the assembled plant protector 300 can provide several forms of protection and several benefits. For example, the assembled plant protector 300 provides protection from wind damage. Further, the assembled plant protector 300 acts as a mini greenhouse boosting the temperature around the plant or plants 302. This is especially advantageous in the fall. Increased temperatures in cooler fall conditions help extend the growing season and thus can help yield more produce. Increased temperatures also help ripen fruits and vegetables, and reduce or eliminate damage from frost. Expedited ripening assists growers to harvest their plants before serious snow or frost ruins a season's worth of hard work. Further, expedited ripening allows growers to harvest their plants at an appropriate time when fruits and vegetables are ripe.

Variations

While the invention is described with respect to one or more exemplary and preferred implementations, other implementations are possible. The concepts disclosed herein apply equally to other systems, devices and methods for covering and protecting plants. The invention is described with reference to the accompanying figures where it is noted that characteristics and features shown in the figures are not drawn to scale unless otherwise noted herein.

It will be understood that terms used herein, including in the claims, are generally intended as "open" terms (e.g., the term "including" should be interpreted as "including but not limited to," the term "having" should be interpreted as "having at least," the term "includes" should be interpreted as "includes but is not limited to"). It will be further understood by those within the art that if a specific number of an introduced claim recitation is intended, such an intent will be explicitly recited in the claim, and in the absence of such recitation no such intent is present.

For example, as an aid to understanding, the following claims may contain usage of the introductory phrases "at least one" and "one or more" to introduce claim recitations. The use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and "an" should typically be interpreted to mean "at least one" or "one or more"). The same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C," is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Moreover, "can" and "optionally" and other permissive terms are used herein for describing optional features of various embodiments. These terms likewise describe selectable or configurable features generally, unless the context dictates otherwise.

The described aspects of the invention depict different components contained within, or connected with, different other components. It is to be understood that such depicted elements are merely exemplary, and that in fact many other elements can be implemented which achieve the same functionality. Further, it is to be understood that one of ordinary skill in the art as to the invention described herein is someone familiar with plants and crops.

The foregoing discussion has been presented for purposes of illustration and description. Various features from one implementation can be combined with other features from other implementations. The description is not intended to limit the invention to the form or forms disclosed herein. Consequently, variation and modification commensurate with the above teachings, within the skill and knowledge of the relevant art, are within the scope of the present invention. The implementations described herein and above are also intended to explain the best mode presently known of practicing the invention and to enable others skilled in the art to use the invention, or in other implementations, and with the various modifications required by their particular application or uses of the invention. It is intended that the appended claims be construed to include alternate implementations to the extent permitted. Thus, the appended claims are to encompass within their scope all variations and modifications as are within the spirit and scope of this subject matter described herein.

We claim:

1. A plant cover for protecting against cold temperature and inclement weather, wherein the plant cover is made from a flexible sheet of material, the plant cover comprising:
   a curvilinear bottom edge;
   at least one assembly tab formed along a first lateral edge, at least one assembly slot formed along a second lateral edge, the at least one assembly slot configured to receive a portion of a corresponding assembly tab; and
   at least two flexible top flaps, wherein each flexible top flap is configurable to at least partially enclose a top portion of the plant cover, wherein each flexible top flap includes a slotted top tab, wherein the slotted top tab includes a generally transverse slot that is open on one side, and wherein the transverse slot is generally transverse to the top flap, and wherein the top portion of the plant cover may be partially enclosed by engaging together the slots of two or more slotted top tabs.

2. The plant cover of claim 1 wherein each of the at least one assembly tab is inserted in one of a corresponding assembly slot thereby forming the flexible sheet into a frustum shape, wherein the bottom edge forms a larger opening of the frustum shape when the plant protector is assembled.

3. The plant cover of claim 1 wherein each of the at least two flexible top flaps is scallop shaped, wherein an edge of each scallop shaped flexible top flap is configured to overlap with at least one other flexible top flap to at least partially enclose the top portion of the plant cover when the slots of the slotted top tabs are engaged together.

4. The plant cover of claim 1 wherein the flexible material is translucent.

5. The plant cover of claim 1 wherein the flexible material is a high density polyethylene.

6. The plant cover of claim 1, wherein each of the at least one assembly tab includes at least two arms, and wherein the plant cover comprises two assembly slots for each arm of each assembly tab, and wherein the assembly slots are arranged in pairs along the second lateral edge of the flexible sheet of material.

7. The plant cover of claim 1, wherein the plant cover comprises at least two assembly slots, and wherein the at least two assembly slots are arranged in pairs, and wherein the at least two flexible top flaps are designated a first top flap and a second top flap, and wherein at least a portion of the second top flap overlaps and contacts a portion of the first top flap when the top flaps are folded to a closed position.

8. The plant cover of claim 1, wherein the plant cover further comprises one or more ventilation flaps, and one or more arches formed in the curvilinear bottom edge.

9. The plant cover of claim 1, the plant cover further comprising:
   at least one foot panel, wherein each foot panel is connected to the curvilinear bottom edge.

10. The plant cover of claim 9 wherein each foot panel is hingedly connected to the curvilinear bottom edge.

11. The plant cover of claim 9 wherein the plant cover further comprises at least one stake removably mounted through a respective aperature in one of the at least one foot panels.

12. The plant cover of claim 1, wherein each of the at least one assembly tab includes at least three arms, and wherein the plant cover comprises two assembly slots for each of two of the three arms, and wherein the assembly slots are arranged in pairs along the second lateral edge of the flexible sheet of material.

13. A method for assembling a plant cover made from at least one flexible panel or sheet of material, the method comprising:
   engaging each of a plurality of assembly tabs of a first lateral edge of the plant cover with a second lateral edge of the plant cover;
   engaging each of a plurality of feet from a bottom edge of the plant cover into soil; and
   engaging a closure mechanism of at least two top flaps to at least partially close a top portion of the plant cover, wherein the closure mechanism includes at least two flexible top flaps, wherein each flexible top flap includes a slotted top tab, wherein the slotted top tab includes a generally transverse slot that is open on one side, and wherein the transverse slot is generally transverse to the top flap, and wherein said engaging of the closure mechanism includes engaging together the generally transversal slots.

14. The method of claim 13, wherein each of the plurality of assembly tabs includes at least two tab members, and wherein engaging each of the plurality of assembly tabs of the first lateral edge of the plant cover with the second lateral edge of the plant cover includes engaging the at least two tab members substantially simultaneously when assembling the plant cover.

15. The method of claim 13, the method further comprises:
   engaging at least one stake with at least one of the plurality of feet when installing the plant cover.

* * * * *